United States Patent [19]

Aikawa

[11] 3,909,035

[45] Sept. 30, 1975

[54] SUSPENSION UNIT FOR A MOTOR VEHICLE SHOCK ABSORBER

[75] Inventor: Hiroshi Aikawa, Tokyo, Japan

[73] Assignee: Nissan Motor Company Limited, Yokohama, Japan

[22] Filed: Oct. 17, 1972

[21] Appl. No.: 298,447

[30] Foreign Application Priority Data
Oct. 23, 1971 Japan.............................. 46-83667

[52] U.S. Cl............................ 280/124 F; 267/64 R
[51] Int. Cl............................................. B60g 11/26
[58] Field of Search..... 280/124 F; 267/65 D, 64 R, 267/64 A

[56] References Cited
UNITED STATES PATENTS

| 3,036,844 | 5/1962 | Vogel............................. 267/64 R |
| 3,250,526 | 5/1966 | Kress............................. 280/124 F |
| 3,570,832 | 3/1971 | Ortheil........................... 267/64 R |
| 3,592,485 | 7/1971 | Ruhl.............................. 280/124 F |
| 3,807,717 | 4/1974 | Ito................................. 267/64 R |

Primary Examiner—Philip Goodman
Assistant Examiner—John A. Carroll

[57] ABSTRACT

A suspension unit for a motor vehicle comprising a cylinder filled with hydraulic fluid, a piston axially slidable in the cylinder chamber, a free piston axially slidable fitted in the cylinder chamber, valve means for selectively providing fluid communication between the cylinder chamber and externally provided hydraulic elements in response to the axial movement of the free piston, and a pneumatic spring unit for absorbing bumps transferred to the suspension unit. The pressure and volume of fluid in the cylinder chamber is changed so that it causes the cylinder to move away from or towards the piston when the suspension unit is contracted or extended due to change in the load carried by the vehicle.

10 Claims, 4 Drawing Figures

SUSPENSION UNIT FOR A MOTOR VEHICLE SHOCK ABSORBER

This invention relates to a suspension system of a motor vehicle and, more particularly, to a hydropneumatic suspension unit forming part of the motor vehicle suspension system.

In recent years, a suspension system using a pneumatic spring unit has been adopted for motor vehicles, especially for passenger cars. The trend is a result of this kind of a suspension system's capability to reduce the spring constant to a minimum, to preserve its natural buoyancy and frequency constant substantially independent of the fluctuation of load, to obtain the attenuation of the spring with ease and less impact force resulting in a longer life of the vehicle body and less bumping and vibrating action on the passengers, and, furthermore, it can control its position automatically.

The typical pneumatic spring unit used at present in the suspension system for motor vehicles includes a diaphragm type pneumatic spring. However, a hydropneumatic type pneumatic spring is perhaps the best for passenger cars because of its compactness and the fact that some cars already use that kind of a spring successfully.

A hydro-pneumatic spring unit used at present in a suspension system of a motor vehicle usually includes a spool valve for controlling the direction of the hydraulic fluid flow. The use of the spool valve, however, has the disadvantage in that it cannot be provided with oil seals for its spool owing to its inherent construction with the consequent result that hydraulic fluid leakage inevitably occurs at the clearance between the spool and the valve bore. Therefore, the use of the spool valve causes greater consumption of hydraulic fluid, and moreover, lowering of the vehicle, level takes place due to the hydraulic fluid leakage when the vehicle stops and the hydraulic pump ceases to feed hydraulic fluid to the spool valve.

This invention contemplates to eliminate the aforementioned disadvantage of the known hydropneumatic spring unit for a suspension system of a motor vehicle, and to provide a novel and improved hydro-pneumatic suspension unit for a motor vehicle without using a spool valve.

It is, therefore, an object of the present invention to provide a suspension unit which is adapted to maintain the body structure of a motor vehicle substantially at a constant level over the road surface under any condition.

It is another object of the present invention to provide a suspension unit the consumption of hydraulic fluid of which is reduced to a minimum.

It is still another object of the present invention to provide a suspension unit in which the leakage of hydraulic fluid is prevented.

It is further object of the present invention to provide a suspension unit in which the road clearance of the motor vehicle can be adjusted depending upon the conditions of the road surface.

Briefly, the foregoing features and other objects of the prsent invention are attained basically by a suspension unit comprising a cylinder having a cylinder chamber filled with hydraulic fluid, a cylinder head having fluid inlet and outlet passageways, a piston which is axially slidable in the cylinder chamber and consists of a piston head and a piston rod projecting from the piston and extending outwardly from the cylinder through one end of the cylinder opposite to the cylinder head, restricting passage means for providing fluid communication therethrough thereby to dampen the vibrating and bumping action on the suspension unit, a pneumatic spring unit having a casing which is divided by a flexible partition member into a gas chamber filled with pressurized gas and a fluid chamber filled with fluid and communicating with the cylinder chamber, a free piston which is axially slidable filled in the cylinder chamber and has a passage providing fluid communication thereacross, valve means for selectively providing fluid communication between the cylinder chamber and a source of hydraulic fuid through the fluid inlet passage and between the cylinder chamber and an outlet line through the outlet passage in response to the axial movement of the free piston, a first preloaded spring mounted between the upper end wall of the cylinder chamber and the free piston thereby to bias the free piston away from the upper end wall of the cylinder chamber, and a second preloaded spring mounted between the free piston and the piston thereby to bias the free piston towards the upper end wall of the cylinder chamber. The fluid inlet passage communicates at its one end with the cylinder chamber and at the other end thereof with the source of hydraulic fluid, and the fluid outlet passage communicates at its one end with the cylinder chamber and at the other end thereof with the drain line. The piston rod and the cylinder head are connected to a wheel supporting member such as an axle and the body structure of a motor vehicle, respectively. The restricting passage means may be located either at the piston head or between the cylinder chamber and the pneumatic spring unit. The first and second preloaded springs cooperate with each other to hold the free piston in a balanced position. The cylinder chamber is brought into communication with the source of hydraulic fluid through the inlet passage when the cylinder is moved relative to the piston in the direction of decreasing the length of the suspension unit to cause the free piston to move in excess of a predetermined limit and with the outlet line through the outlet passage when the cylinder is moved relative to the piston in the direction of increasing the length of the suspension unit to cause the free piston to move in excess of a predetermined limit.

According to a preferred embodiment of the invention, the valve means include a first valve and a second valve. The first valve is fitted in the inlet passage, and has a valve head, a spring for urging the valve head at all times in the direction of closing the inlet passage, and a detecting member having a predetermined length and projecting from the valve head into the cylinder chamber to detect the axial movement of the free piston in excess of a predetermined limit. The second valve has a valve head, a valve stem having a predetermined length and connected to the valve head, a spring for urging the valve head at all times in the direction of closing the outlet passage, and a detecting member provided at one end of the valve stem for detecting the axial movement of the free piston in excess of a predetermined limit. The detecting member of the second valve is received in a recess formed in the free piston and is axially slidable relative thereto. The recess in the free piston has an engaging portion for engaging with the detecting member of the second valve when the axial movement of the free piston exceeds a predetermined limit.

According to another preferred embodiment of the present invention, the inlet passage further includes a first chamber communicating at one end with the source of hydraulic fluid, and a second chambere and at the other end with the cylinder chamber through the inlet passage. The cylinder head further includes a third chamber communicating at one end with a drain line through a first auxiliary passage having a restrictor therein and at the other end with the cylinder chamber. The outlet passage further includes a fourth chamber communicating with the outlet line, and a fifth chamber communicating at one end with the fourth chamber and at the other end with the cylinder chamber. The cylinder head still further includes a second auxiliary passage communicating with the cylinder chamber and with the drain line through a restrictor provided therein. The valve means comprise an inlet valve, a first control valve, an outlet valve and a second control valve. The inlet valve consists of a valve head situated in the first chamber, a piston having a body portion and a flange portion provided at one end of the body portion and axially slidable in the first and second chambers, and a spring for urging at all times the inlet valve in the direction of opening the inlet valve. The valve head of the inlet valve is seated on the piston. The body portion of the piston of the inlet valve is hermetically and slidably received in the inlet passage between the first and second chambers thereby to shut off fluid communication therebetween. The flange portion of the piston divides the second chamber into an upper portion and a lower portion, and is hermetically and slidably received in the second chamber thereby to shut off direct fluid communication between the upper portion and the lower portion of the second chamber. The upper portion of the second chamber communicates with the third chamber. The lower portion of the second chamber communicates with the cylinder chamber. The piston has a passage therein providing communication between the first chamber and the lower portion of the second chamber. The spring of the inlet valve is seated on the flange portion of the piston of the inlet valve. The first control valve is situated in the third chamber, and includes a valve head, a valve seat, a spring normally urging the first control valve in a valve closing position, and a detecting member having a predetermined length and projecting from the valve head into the cylinder chamber to detect the axial movement of the free piston in excess of a predetermined limit thereby to open the first control valve. The spring of the inlet valve and the sectional area of the flange portion of the piston of the inlet valve are selected so that when the first control valve is closed to shut off fluid communication between the cylinder chamber and the upper portion of the second chamber, the total force caused by the fluid pressure acting on the bottom surface of the flange portion of the piston exceeds the total force of the spring of the inlet valve acting on the upper surface of the flange portion thereby to close the inlet valve, and when the first control valve is opened to provide fluid communication between the cylinder chamber and the upper portion of the second chamber thereby to apply fluid pressure to the upper surface of the flange portion of the piston of the inlet valve, the sum of the total force caused by the fluid pressure and the total force of the spring of the inlet valve acting on the upper surface of the flange portion exceeds the total force caused by the fluid pressure acting on the bottom surface of the flange portion thereby to open the inlet valve. The outlet valve consists of a valve head situated in the fourth chamber, a piston having a body portion and a flange portion provided at one end of the body portion and axially slidable in the fourth and fifth chambers, and a spring for urging at all times the outlet valve in the direction of opening the outlet passage. The valve head of the outlet valve is seated on the piston. The body portion of the piston of the outlet valve is hermetically and slidably received in the inlet passage between the fourth and fifth chambers thereby to shut off fluid communication therebetween. The flange portion of the piston of outlet valve divides the fourth chamber into an upper portion and a lower portion, and is hermetically and slidably received in the fifth chamber thereby to shut off fluid communication between the upper portion and lower portion of the fifth chamber. The upper portion of the fifth chamber communicates with the second auxiliary passage at a portion between the cylinder chamber and a restrictor formed in the second auxiliary passage. The lower portion of the fifth chamber communicates with the cylinder chamber. The piston of the outlet valve has a passageway therein providing communication between the fourth chamber and the lower portion of the fifth chamber. The spring of the outlet valve is seated on the flange portion of the piston of the outlet valve. The second control valve normally closes the second auxiliary passageway, and has a detecting member to detect the axial movement of the free piston in excess of a predetermined limit thereby to open the second control valve. The spring of the outlet valve and the sectional area of the flange portion of the piston of the outlet valve are selected so that when the second control valve is closed to shut off the fluid communication between the cylinder chamber and the upper portion of the fifth chamber, that total force caused by the fluid pressure acting on the bottom surface of the flange portion of the piston of the outlet valve exceeds the total force of the spring of the outlet valve acting on the upper surface of the flange portion of the piston of the outlet valve thereby to close the outlet valve, and when the second control valve is opened to provide fluid communication between the cylinder chamber and the upper portion of the fifth chamber thereby to apply fluid pressure to the upper surface of the flange portion of the piston of the outlet valve, the sum of the total force caused by the fluid pressure and the total force of the spring of the outlet valve acting on the upper surface of the flange portion of the outlet valve exceed the total force caused by the fluid pressure acting on the bottom surface of the flange portion of the piston of the outlet passage thereby to open the outlet valve. In this embodiment, the second control consists of a valve head, a valve stem having a predetermined length and connected to the valve head, and a detecting member provided at one end of the valve stem for detecting the axial movement of the free piston in excess of a predetermined limit, and a spring urging the second seat valve at all times in the direction of closing the second auxiliary passage. The detecting member is received in a recess formed in the sliding member and slidable relative thereto. The recess has an engaging portion for engaging the detecting member when the axial movement of the free piston exceeds a predermined limit.

In a modification of this embodiment, the second auxiliary passageway may communicate with the cylinder chamber between the free piston and the piston, and includes a sixth chamber for receiving the second control valve. The second control valve may have a valve head, a spring for urging the second valve at all times in a direction of closing the second auxiliary passageway, and a detecting member projecting from the valve head of the second control valve into the cylinder chamber between the free piston and the piston. The detecting member has a predetermined length, and detects the axial movement of the free piston in excess of a predetermined limit to open the second control valve thereby to provide communication between the upper portion of the fifth chamber and the cylinder chamber between the free piston and the piston.

According to a still further embodiment of the invention, the suspension unit may further comprise vehicle level adjusting means by selecting the total length of the suspension unit. In this embodiment, the piston rod has an axial bore open at one end to the cylinder chamber and at the other end communicating with the source of hydraulic fluid. The vehicle level adjusting means comprise a floating piston axially slidable in the bore formed in the piston rod for defining a control fluid chamber between the floating piston and the end of the piston rod, and a control fluid regulator valve unit for selectively providing fluid communication between the control fluid chamber and the source of hydraulic fluid. The floating piston receives at its upper surface the second preloaded spring.

A more complete appreciation of the present invention will be readily obtained as the same becomes better understood by reference to the following detailed description when taken in conjunction with the accompanying drawings, wherein.

Reference is now made to the drawings, wherein like reference numerals designate identical, or corresponding parts throughout the views.

Figure 1:
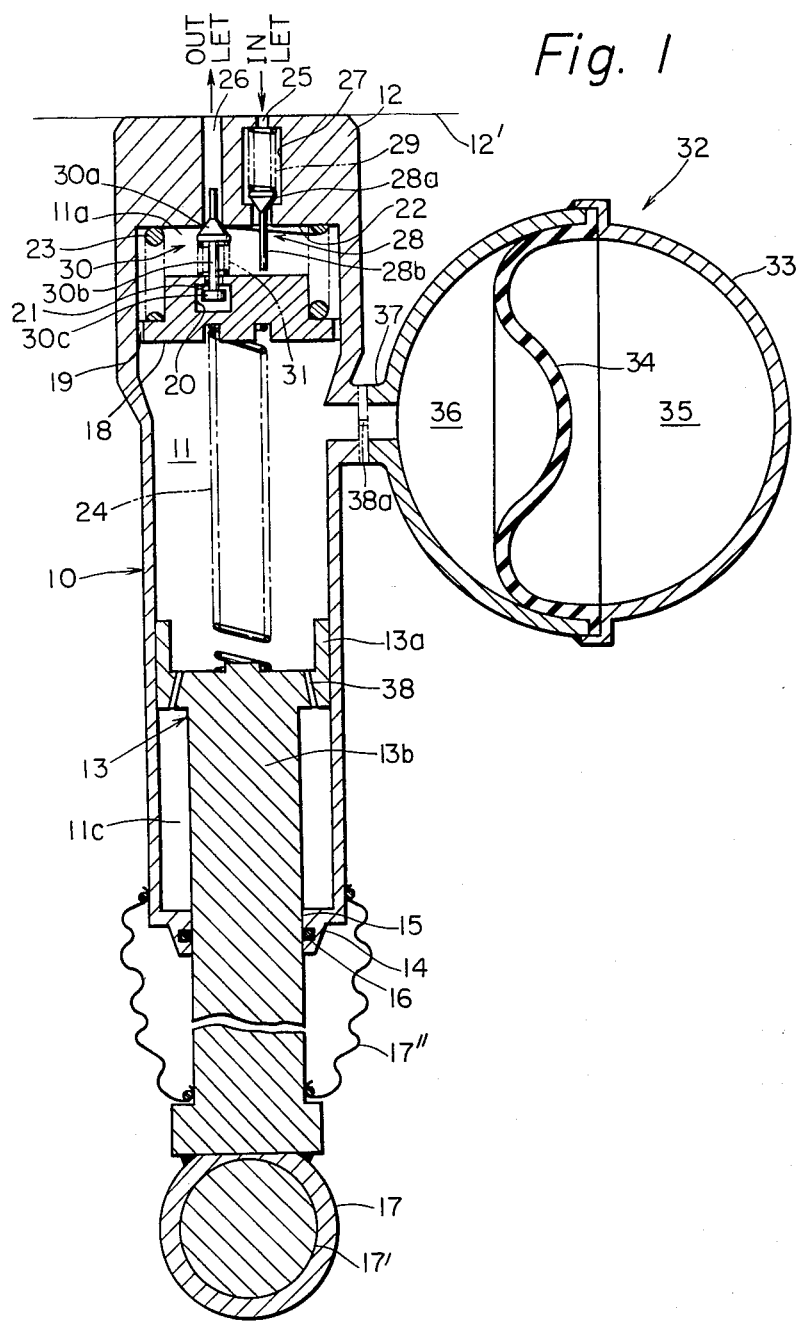
FIG. 1 is a longitudinal sectional view of the suspension unit for a motor vehicle according to a preferred embodiment of the present invention.

In FIG. 1, the suspension unit embodying the present invention has a cylinder 10 having a cylinder bore or chamber 11 which is formed axially therein. The cylinder bore 11 is closed at its upper end by a cylinder head 12 which is connected to a vehicle body 12'. A piston 13 is axially slidably received in the cylinder chamber 11. The piston 13 consists of a piston head 13a and a piston rod 13b. The piston rod 13b projects from the cylinder head 13a and extends externally of the cylinder 10 through a lower end wall 14 of the cylinder 10. The piston rod 13b is slidably and hermetically received in a hole 15 formed in the end wall 14 of the cylinder 10. A hermetic seal 16 is provided around the periphery of the hole 15. The piston rod 13b has at its leading end a mounting eye 17 through which the piston rod 13b is connected to wheel supporting means such as an axle 17'. Reference numeral 17'' denotes a bellows-like flexible dust cover which encloses the lower end portion of the cylinder 10 and the piston rod 13b for the purpose of dust-proofing. A free piston 18 is axially slidably received in the upper portion of the cylinder chamber 11 surrounded by the cylinder head 12. The free piston 18 has formed therein one or more passages 19 providing communication thereacross, a recess 20. Three separate compartments are thus formed in the cylinder chamber 11. A first compartment 11a is defined between an upper end wall 22 of the cylinder chamber 11 and the upper surface of the free piston 18. A second compartment 11b is defined between the lower surface of the free piston 18 and the upper surface of the piston head 13a. A third compartment 11c is defined between the lower surface of the piston head 13a and the lower end wall 14 of the cylinder 10. The first, second and third compartments 11a, 11b and 11c are filled with hydraulic fluid. The free piston 18 is held in a balanced position by means of a first and a second preloaded or compression spring 23 and 24. The first preloaded spring 23 is mounted in the first compartment 11a of the cylinder chamber, and seated at one end on the upper end wall 22 of the cylinder head and at the other end on the upper surface of the free piston 18. The second preloaded spring 24 is mounted in the second compartment 11b of the cylinder chamber 11, and seated at one end on the lower surface of the free piston 18 and at the other end on the upper surface of the piston head 13a. The first preloaded spring 23 thus biases the free piston away from the upper end wall 22 of the cylinder chamber 11 while the second preloaded spring 23 biases the free piston 18 towards the upper end wall 22, i.e., away from the piston 13 against the force of the first preloaded spring 23. Thus the free piston 18 is held in a balanced position. The cylinder head 12 has formed therein an inlet passage 25 and an outlet passage 26. The inlet passage 25 communicates at its one end with a source of hydraulic fluid (not shown) and at the other end with the first compartment 11a of the cylinder chamber 11. The outlet passage 26 communicates at its one end with an outlet line and at the other end with the first compartment 11a of the cylinder chamber 11. A chamber 27 is formed in the inlet passage 25. A first valve 28 is fitted in the chamber 27, and consists of a valve head 28a and a detecting member or sensor 28b projecting from the valve head 28a. The first valve 28 is normally closed by a spring 29 to close the inlet passage 25. The detecting member or sensor 28b has a predetermined length and projects into the first compartment 11a of the cylinder chamber 11. It detects the axial movement of the free piston 18 in excess of a predetermined limit thereby to open the first valve 28, i.e., to open the inlet passage 25 against the force of the spring 29. The second valve 30 is adapted to normally close the outlet passage 26, and consists of a valve head 30a, a valve stem 30b projecting from the valve head 30a, and a detecting member or head or sensor 30c provided at the end of the valve stem 30b. A spring 31 urges the second valve 30 to normally close the outlet passage 26. The detecting member 30c is axially slidably received in the recess 20 formed in the free piston 18. The length of the second valve 30 is predetermined so that a predetermined clearance can be obtained between the detecting member 30c and the engaging portion 21 when the valve 30 is closed and the free piston 18 is in a balanced position. Thus the axial movement of the free piston 18 in excess of a predetermined limit causes the detecting member 30c to engage the engaging portion 21 formed in the free piston 18 thereby to open the second valve 30, i.e., to open the outlet passage 26 against the force of the spring 31. A pneumatic spring unit 32 which is provided for the purpose of dampening the impacts caused by road bumps by accepting a portion of the hydraulic fluid displaced by the introducing piston in compartment 11b is provided externally of the cylinder 10. The pneumatic spring unit 32 includes a casing 33 which is internally divided by a flexible partition member 34 into separate chambers 35 and 36. The chamber 35 is totally enclosed by the casing 33 and the flexible partition member 34 and is filled with the flexible partition member 34 and is filled with a compressible gas such as nitrogen under pressure. The other chamber 36 communicates with the second compartment 11b of the cylinder chamber 11 through a tube 37 connecting the pneumatic unit 32 to the cylinder 10. The chamber 36 is thus filled with hydraulic fluid from the cylinder chamber 11. Restricted passage means is provided in the form of a generally axially extending passage or passages 38 in the piston head 13a, providing fluid communication across the piston head 13a, viz., between the second and third compartments 11b and 11c. The passage or passages 38 are intended to permit hydraulic fluid in the two compartments 11b and 11c to flow from one to the other so as to partially dampen the impacts of road bumps transferred to the suspension unit from the vehicle wheel associated with the suspension unit. The restricted passage means may be provided in the tube connecting the pneumatic spring unit 32 and the cylinder 10 in the form of a restricted passage 38a in place of the passage or passages 38. The restricted passage 38a restricts the flow of fluid between the chamber 36 of the pneumatic spring unit 32 and the cylinder chamber 11 so as to dampen the bumps transferred to the suspension unit from the vehicle wheel. In this case the compartment 11c may open to the atmosphere.

In operation, when the suspension unit which is maintained in a balanced condition as illustrated is subjected to shocks as during cruising of the motor vehicle on a bumpy road surface, then the shocks are transferred from the piston rod 13b and the piston head 13a to the fluid in the second compartment 11b in the cylinder chamber 11. These shocks cause the fluid flow between the compartment 11b and the chamber 36 through the tube 37 thereby causing the chamber 36 to absorb and desorb the fluctuating fluid volume. This oscillating motion of the partition member 34 is in turn dampened by the fluid flow between the compartment 11b and the compartment 11c through the restricting orifices or passages 38 provided in the piston head 13a. The restricting orifice or passage 38a may be provided in the tube 37 instead of the restricting orifices or passages 38 for dampening the oscillating motion of the partition member 34. In this case, the compartment 11c may be open to the atmosphere. Under this condition, the free piston 18 is maintained substantially stationary because the fluid volume in the compartment 11a stays substantially constant. Accordingly, the first and second valves remain closed. The dynamic characteristics of the free piston 18 can be selected suitably by varying the preload and spring constant of the spring 23 and the effective area of the passage 19.

Under a condition in which the vehicle carries an increased load, the suspension unit is forced to contract in the axial direction with the cylinder 10 moved downwardly, viz., towards the axle 17' carried by the mounting eye 17. This causes the piston 13 to move upwardly relative to the cylinder 10. This upward movement of the piston 13 is transmitted by the spring 24 to the free piston 18 to cause the free piston 18 to move upwardly. When the free piston 18 has moved upwardly to reach a predetermined limit, then the free piston 18 engages the leading end of the detecting member or sensor 28b of the first valve 28 and pushes the detecting member 28b upwardly to open the first valve, i.e., to open the inlet passage 25 thereby to introduce hydraulic fluid into the first compartment 11a of the cylinder chamber 11. Thus, the fluid pressure in the compartment 11a is increased, and the free piston 18 is moved downwardly. This downward movement of the free piston 18 is transmitted to the piston 13 by means of the second preloaded spring 24 and hydraulic fluid in the second compartment 11b thereby to move the piston 13 downwardly relative to the cylinder 10. Thus, the suspension unit tends to increase its total length. When the free piston 18 has moved downwardly sufficiently to disengage the detecting member 28b of the first valve 28 thereby to close the first seat valve 28, i.e., the inlet passageway 25 and returned to its initial balanced position as illustrated in FIG. 1, the suspension unit assumes its initial total length to bring the level of the vehicle body 12' back to its initial elevation, thereby restoring the predetermined road clearance. The increased fluid volume is absorbed by the element 32.

Under a condition in which the vehicle carries a reduced load, on the contrary, the cylinder 10 moves upwardly away from the axle 17' to increase the total length of the suspension unit. Consequently, the piston 13 is moved downwardly relative to the cylinder 10. This downward movement of the piston 13 is transmitted by the second preloaded spring 24 to the free piston 18. Therefore, the free piston 18 is moved downwardly in the cylinder chamber 11. When the free piston 18 has moved downwardly to reach a predetermined limit, then the free piston 18 engages at its engaging portion 21 the detecting member or sensor 30c of the second valve 30 and pull the detecting member 30c downwardly to open the second valve 30, i.e., the outlet passage 26 thereby to drain hydraulic fluid in the first compartment 11a of the cylinder chamber 11. In this manner, the fluid pressure and volume in the compartment 11a are reduced. The pressure difference between the fluid in the first compartment 11a and the fluid in the second compartment 11b causes the free piston 18 to move upwardly. This upward movement of the free piston 18 is transmitted by the second preloaded spring 24 and hydraulic fluid in the cylinder chamber 11 to the piston 13 thereby to move the piston upwardly relative to the cylinder 10. Thus the suspension unit tends to decrease its total length. When the free piston 18 has sufficiently moved upwardly to disengage the detecting member 30c of the second valve 30 thereby to close the second valve 30, i.e., the outlet passage 26 and returned to its initial position as illustrated in FIG. 1, the suspension unit assumes its initial total length. The vehicle body 12' is thus moved back to its initial position, thereby restoring the predetermined road clearance.

Figure 2:
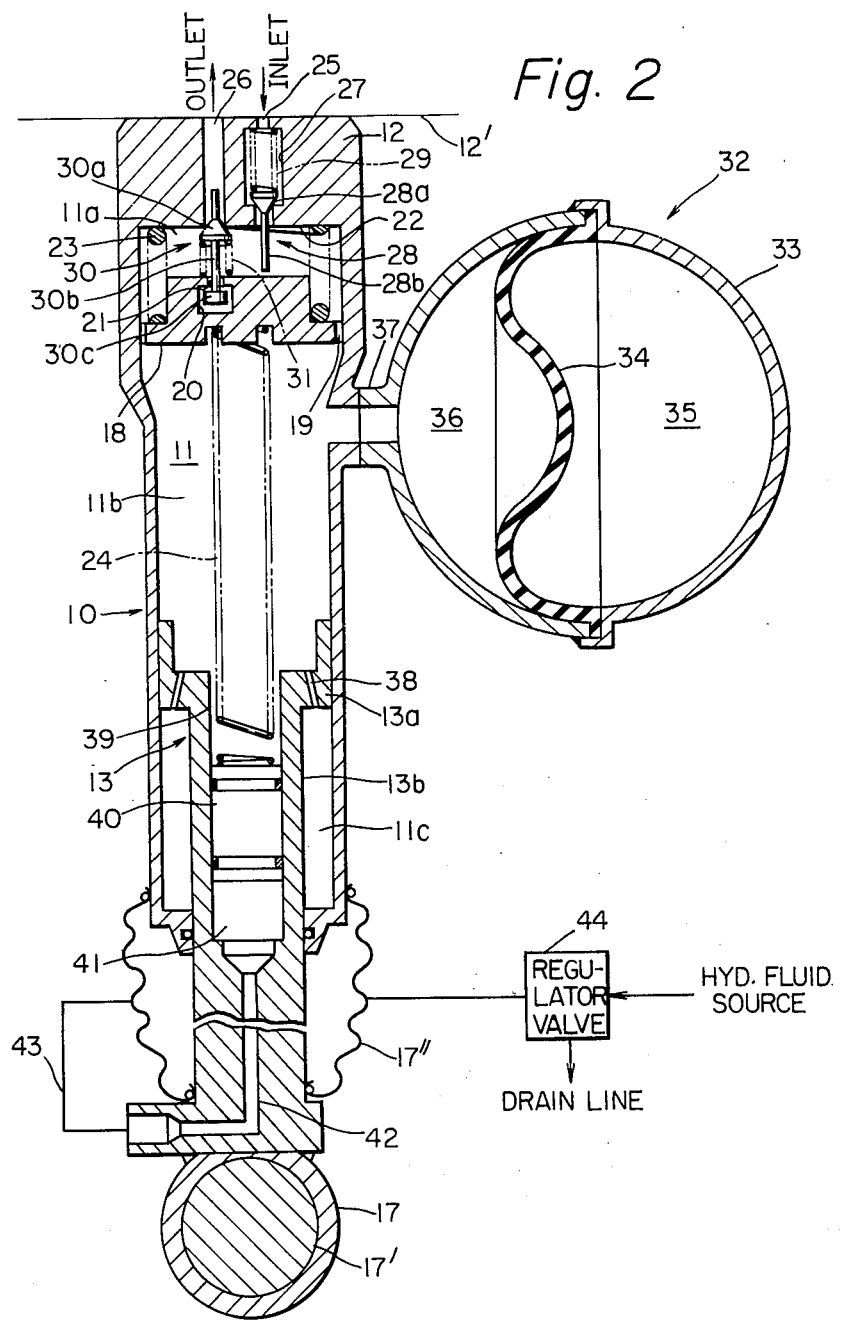
FIG. 2 is a longitudinal sectional view of the suspension unit having vehicle level adjusting means according to one embodiment of the present invention.

FIG. 2 illustrates a modification of the embodiment shown in FIG. 1, wherein vehicle level adjusting means are also included. The piston rod 13b has an axial bore 39 open to the second compartment 11b of the cylinder chamber 11. A floating piston 40 is axially and slidably received in the bore 39 of the piston rod 13b. The floating piston 40 defines a control fluid chamber 41 between the lower surface of the floating piston 40, the walls of the bore 39 and the lower end portion of the piston rod 13b. The control fluid chamber 41 communicates with the source of hydraulic fluid through a passageway 42 formed in the lower end portion of the piston rod 13b, a line 43 connected to the passage 42, and a level control fluid regulator valve unit 44. The level control regulator valve 44 may be constructed in any desired manner in so far as it is adapted to selectively feed and block passage of hydraulic fluid to the line 43 when the valve unit 44 is so actuated manually or in an automatic manner. The second preloaded spring 24 is seated on the floating piston 40.

In operation, when a higher vehicle level is desired, the regulator valve 44 is actuated to feed hydraulic fluid to the control fluid chamber 41 thereby to increase the volume of the control fluid chamber 41. The volume increase of the control fluid chamber 41 causes the floating piston 40 to move upwardly. This upward movement of the floating piston 40 is transmitted to the free piston 18 by the spring 24 thereby to move the free piston 18 upwardly. Thus the free piston 18 is moved to a new balanced position in the same manner as described in the embodiment shown in FIG. 1. Consequently, the suspension unit increases its total length to obtain a higher vehicle level. When a lower vehicle level is desired, the regulator valve 44 is actuated to drain the hydraulic fluid in the control fluid chamber 41 thereby to decrease the volume of the control fluid chamber 41. The volume decrease of the control fluid chamber 41 causes the floating piston to move downwardly. The downward movement of the floating piston 40 is transmitted to the free piston 18 by the spring 24 thereby to move the free piston 18 downwardly. Thus the free piston 18 is moved to a new balanced position in the same manner as described in the embodiment shown in FIG. 1. Consequently, the suspension unit decreases its total length to obtain a lower vehicle level. When the desired vehicle level is reached, the regulator valve unit 44 is actuated to block passage of hydraulic fluid.

Figure 3:
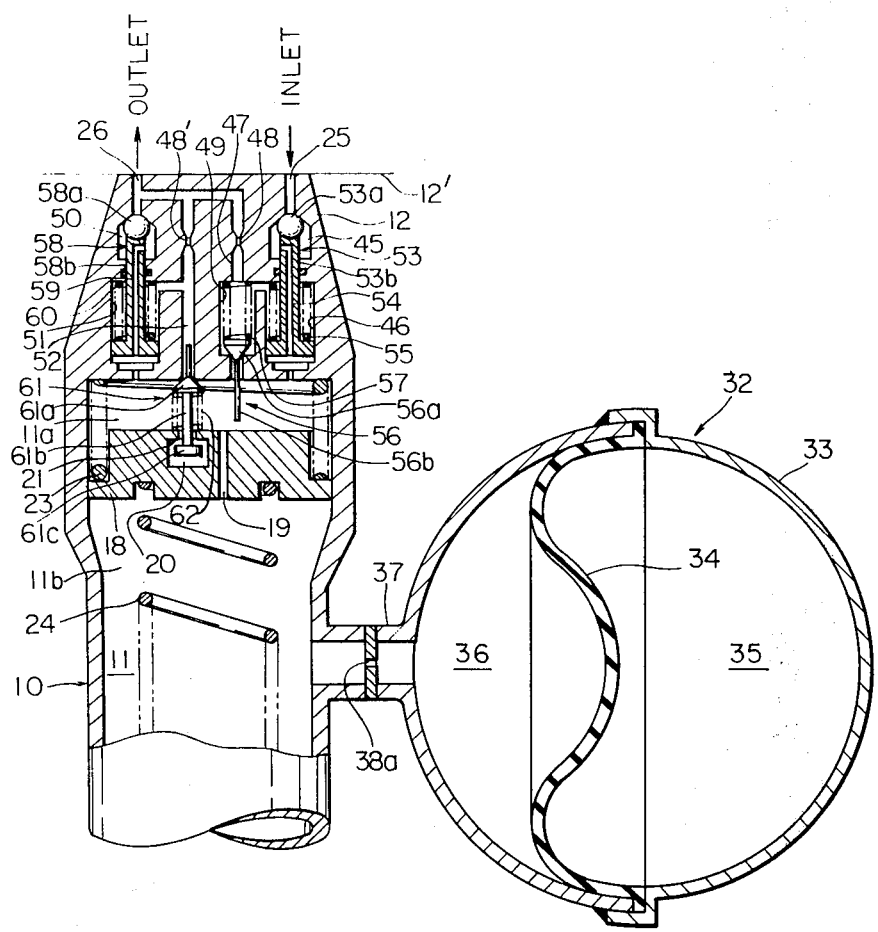
FIG. 3 is a fragmentary longitudinal sectional view of the suspension unit having modified valve means according to the present invention.

FIG. 3 illustrates another modification of the embodiment shown in FIG. 1, wherein the valve arrangement is modified. The cylinder head 12 further includes in the inlet passage 25 a first chamber 45 and a second chamber 46. The first chamber 45 communicates with the source of hydraulic fluid (not shown) through the inlet passage 25. The second chamber 46 communicates at its upper end with the first chamber 45 through the inlet passage 25 and at the bottom end with the first compartment 11a in the cylinder chamber 11 through the inlet passage 25. The cylinder head 12 also includes a first auxiliary passage 47 communicating at one end with the drain line through a restriction 48 and at the other end with the first compartment 11a of the cylinder chamber 11. A third chamber 49 is provided in the first auxiliary passage 47 between the restriction 48 and the cylinder chamber 11. The cylinder head 12 still further includes in the outlet passage 26 a fourth chamber 50 and a fifth chamber 51. The fourth chamber 50 communicates with the drain line through the outlet passage 26. The fifth chamber communicates at its upper end with the fourth chamber 50 through the outlet passage 26 and at the bottom end with the first compartment 11a of the cylinder chamber 11. The cylinder head also includes a second auxiliary passage 52 which communicates at one end with a drain line through a restrictor 48' and at the other end with the first compartment 11a of the cylinder chamber 11. An inlet valve 53 is fitted in the first and second chambers 45 and 46. The inlet valve 53 consists of a valve head 53a situated in the first chamber 45, a piston 53b having a body portion and a flange portion provided at the lower end of the body portion. The piston 53b is axially slidable in the first and second chambers 45 and 46. The valve head 53a is seated on the piston 53b. The body portion of the piston 53b is hermetically and slidably received in the inlet passage between the first and second chamber 45 and 46. Therefore, the fluid communication between the first and second chambers 45 and 46 through the inlet passage 25 is shut off. The flange portion of the piston 53b divides the second chamber 46 into an upper portion and a lower portion, and is hermetically and slidably received in the second chamber 46. Therefore the fluid communication between the upper and lower portions of the second chamber is shut off. The upper portion of the second chamber 46 communicates with the third chamber 49. The lower portion of the second chamber 46 communicates with the first compartment 11a of the cylinder chamber 11 through the inlet passage 25. The piston 53a has a passage 54 therein providing communication between the first chamber 45 and the lower portion of the second chamber 46. A spring 55 is seated at its one end on the upper end wall of the second chamber 46 and at the other end on the flange portion of the piston 53a, and at all times urges the inlet valve 53 in the direction of opening the inlet valve 53. A first control valve 56 is situated in the third chamber 49, and has a valve head 56a, and a detecting member or sensor 56b projecting from the valve head 56a into the first compartment 11a of the cylinder chamber 11. A spring 57 is fitted in the third chamber 49 and urges the first control valve 56 at all times in the direction of closing the first auxiliary passage 47. The detecting member or sensor 56b has a predetermined length so that a predetermined clearance can be kept between the leading end of the detecting member 56b and the upper surface of the free piston 18 when the valve 56 is closed and the free piston 18 is in a balanced position. The spring 55 of the inlet valve 53 and the sectional area of the flange portion of the piston 53b of the inlet valve are selected so that when the first control valve 56 is closed to shut off fluid communication between the cylinder chamber 11 and the upper portion of the second chamber 46 the total force caused by the fluid pressure acting on the bottom surface of the flange portion of the piston 53b exceeds the total force of the spring 55 of the inlet valve 53 to move the piston 53b upwardly thereby to close the inlet valve 53, i.e., the inlet passage 25 and when the first control valve 56 is opened to provide fluid communication between the cylinder chamber 11 and the upper portion of the second chamber 46 thereby to apply fluid pressure on the upper surface of the flange portion of the piston 53b the sum of the total force caused by the fluid pressure and the total force of the spring 55 exceeds the total force caused by the fluid pressure acting on the bottom surface of the flange portion of the piston 53b to move the piston 53b downwardly thereby to open the inlet valve 53, i.e., the inlet passage 25. An outlet valve 58 is slidably received in the fourth chamber 50 and the fifth chamber 51. The outlet valve 58 consists of a valve head 58a situated in the fourth chamber 50, a piston 58b having a body portion and a flange portion provided at the end of the body portion. The valve head 58a is seated on the piston 58b. The body portion of the piston 58b is hermetically and slidably received in the outlet passage 26 between the fourth and fifth chambers 50 and 51 thereby to shut off fluid communication therebetween through the outlet passage 26. The flange portion of the piston 58b divides the fourth chamber into upper and lower portions, and is hermetically and slidably received in the fifth chamber 51 thereby to shut off fluid communication between the upper and lower portions of the fifth chamber 51 directly. The upper portion of the fifth chamber 51 communicates with the second auxiliary passage 52 at a portion between the restriction 48' and the cylinder chamber 11. The lower portion of the fifth chamber 51 communicates with the first compartment 11a of the cylinder chamber 11 through the outlet passage 26. The piston 58b of the outlet valve 58 has a passage 59 therein providing communication between the fourth chamber 50 and the lower portion of the fifth chamber 51. A spring 60 is seated at its upper end on the upper end wall of the fifth chamber 51 and at the lower end on the flange portion of the piston 58b, and urges at all times the head of the outlet valve 58 in the direction of opening the outlet valve 58, i.e., the outlet passage 26. A second control valve 61 consists of a valve head 61a, a valve stem 61b connected to the valve head 61a, and a detecting member or head or sensor 61c provided at one end of the valve stem 61b. The second control valve 61 is adapted to normally close the second auxiliary passage 52 by the action of a spring 62. The detecting member or head 61c is received in a recess 20 formed in the free piston 18 and is axially slidable relative thereto. The recess 20 is provided with an engaging portion 21 for engaging the detecting member or head 61c. The total length of the second control valve 61 is selected so that a predetermined clearance can be obtained between the engaging portion 21 and the detecting member 61c when the free piston 18 is in a balanced position and the second control valve 61 is in the closed position. The spring 60 of the outlet valve 58 and the sectional area of the flange portion of the piston 58b is selected so that when the second control valve 61 is closed to shut off fluid communication between the first compartment 11a of the cylinder chamber 11 and the upper portion of the fifth chamber 51 the total force caused by the fluid pressure acting on the bottom surface of the flange portion of the piston 58b exceeds the total force of the spring 60 of the outlet valve 58 to move the piston 58b upwardly thereby to close the outlet valve 58, i.e., the outlet passage 26 and when the second control valve 61 is opened to provide fluid communication between the first compartment 11a of the cylinder chamber 11 and the upper portion of the fifth chamber 51 thereby to apply fluid pressure to the upper surface of the flange portion of the piston 58b the sum of the total force caused by the fluid pressure and the total force of the spring 60 acting on the upper surface of the flange portion of the piston 58b exceeds the total force caused by the fluid pressure acting on the bottom surface of the flange portion of the piston 58b to move the piston 58b downwardly thereby to open the outlet valve 58, i.e., the outlet passage 26.

In operation, when the free piston 18 is caused to move upwardly relative to the cylinder 10 by one or more reasons described in connection with the embodiment shown in FIG. 1 and engages and moves upwardly the detecting member 56b to open the first control valve 56, the fluid communication between the first compartment 11a of the cylinder chamber 11 and the upper portion of the second chamber 46 is established to apply fluid pressure on the upper surface of the flange portion of the piston 53b of the inlet valve 53. Thus, the sum of the total force caused by the fluid pressure and the total force of the spring acting on the upper surface of the flange portion exceeds the total force caused by the fluid pressure acting on the lower surface of the flange portion of the piston 53b to move the piston 53b downwardly thereby to open the inlet valve 53, i..e., to open the inlet passage 25. Consequently, hydraulic fluid is introduced into the first compartment 11a of the cylinder chamber 11 from the source of hydraulic fluid (not shown) through the inlet passage 25 and the passage 54 formed in the piston 53b to increase the fluid pressure in the first compartment 11a. The increase in fluid pressure in the first compartment 11a causes the free piston 18 to move downwardly as described in connection with FIG. 1. When the free piston 18 has moved sufficiently to disengage the detecting member 56b of the first control valve 56, the first control valve 56 is closed to shut off fluid communication between the first compartment 11a of the cylinder chamber 11 and the upper portion of the second chamber 46 and the hydraulic fluid in the upper portion of the second chamber 46 is drained into the drain line through the restriction 48 in the first auxiliary passage 47 to eliminate the fluid pressure acting on the upper surface of the flange portion of the piston 53b. Thus the total force caused by the fluid pressure acting on the lower surface of the flange portion of the piston 53b exceeds the total force of the spring 55 and move the piston 53b upwardly thereby to close the inlet valve 53, i.e., to close the inlet passage 25. Consequently, the inflow of hydraulic fluid is blocked and the free piston 18 restores its balanced position as described in connection with FIG. 1.

When the free piston 18 is caused to move downwardly by one or more reasons described in connection with the embodiment shown in FIG. 1, the engaging portion 21 of the free piston 18 engages and moves downwardly the detecting member or sensor 61c of the second control valve 61 to open the valve 61, i.e., to open the second auxiliary passage thereby to establish fluid communication between the first compartment 11a of the cylinder chamber 11 and the upper portion of the fifth chamber 51. Thus the fluid pressure is applied to the upper surface of the flange portion of the piston 58b. Consequently, the sum of the total force caused by the fluid pressure and the total force of the spring 60 acting on the upper surface of the flange portion of the piston 58b exceeds the total force caused by the fluid pressure acting on the lower surface of the flange portion of the piston 58b to move the piston 58b downwardly thereby to open the outlet valve 58, i.e., to open the outlet passage 26. Thus the hydraulic fluid in the first compartment 11a of the cylinder 11 is drained through the outlet passage 26 and the passage 59 formed in the piston 58b to reduce the fluid pressure in the first compartment 11a. The reduction of the fluid pressure in the compartment 11a causes the free piston 18 to move upwardly as described in connection with FIG. 1. When the free piston 18 has moved sufficiently to disengage the detecting member or sensor 61c of the valve 61, the second control valve 61 is closed to shut off fluid communication between the first compartment 11a of the cylinder chamber 11 and the upper portion of the fifth chamber 51 through the second auxiliary passage 52 and the hydraulic fluid in the upper portion of the fifth chamber 51 is drained into the drain line through the restriction 49 in the second auxiliary passage 52 to eliminate the fluid pressure acting on the upper surface of the flange portion of the piston 58b. Thus the total force caused by the fluid pressure acting on the lower surface of the flange portion of the piston 58b exceeds the total force of the spring 60 to move the piston 58b upwardly thereby to close the outlet valve 58, i.e., to close the outlet passage 26. Consequently, the outflow of hydraulic fluid is blocked and the sliding member 18 assumes its balanced position as described in connection with FIG. 1. The functions of valves 28, 30 correspond to those of valves 56, 61, respectively.

With this valve arrangement, each of the first and second control valves 56 and 61 can be controlled by a remarkably small force because the pressure-receiving surface area of each of them can be reduced to a minimum. Therefore they can be responsive to a small variation in load to control the inlet and outlet valves 53 and 58 thereby to feed and drain relatively large amounts of hydraulic fluid rapidly.

Figure 4:
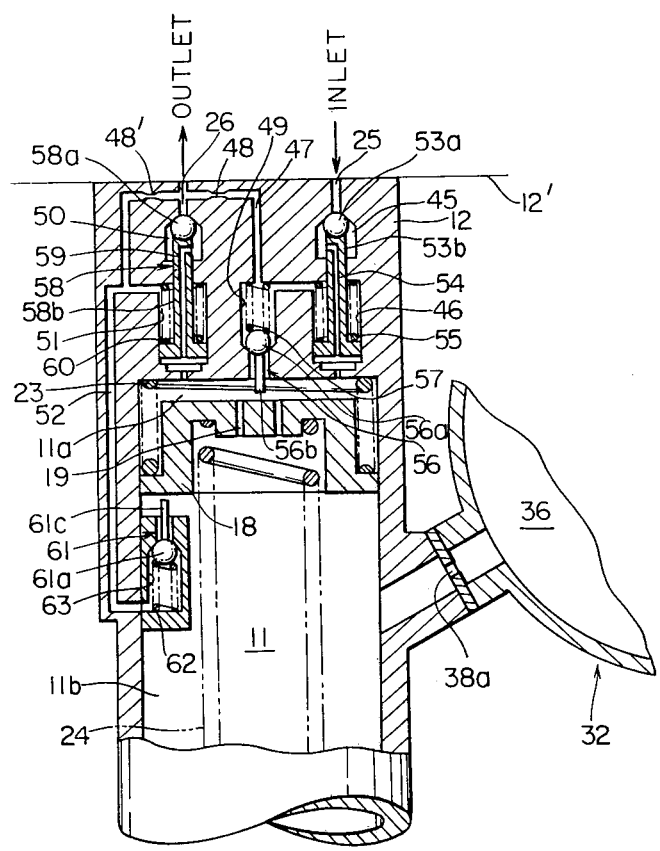
FIG. 4 is a fragmentary longitudinal sectional view of the suspension unit having another modified valve means according to the present invention.

FIG. 4 illustrates a modification of the embodiment shown in FIG. 3.

In this modification, the second auxiliary passage 52 communicates with the second compartment 11b of the cylinder chamber 11. At the end of the second auxiliary passage 52, there is provided a sixth chamber 63 for receiving the second control valve 61. The second control valve 61 consists of a valve head 61a and a detecting member or sensor 61c projecting upwardly from the valve head 61a into the second compartment 11b of the cylinder chamber 11. The second control valve 61 normally closes the second auxiliary passage 52 by the action of the spring 62. The detecting member or sensor 61c has a predetermined length to obtain a predetermned clearance between the leading end of the detecting member 61c and the free piston 18 in its balanced position. When the downward movement of the free piston 18 exceeds a predetermined limit, the free piston 18 engages and moves downwardly the detecting member or sensor 61c to open the second control seat valve 61, i.e., to open the second auxiliary passage thereby to provide fluid communication between the second compartment 11b of the cylinder chamber 11 and the upper portion of the fifth chamber 51. The subsequent operation of this modification is effected in the same manner as described in connection with FIG. 3. This modification is more simple in construction as compared with the modification shown in FIG. 3. The valve heads 56a and 61a, in this modification, are of ball type which can be manufactured with ease.

It should be understood from the foregoing description that the suspension unit according to the present invention can reduce the consumption or leakage of hydraulic fluid to a minimum by the use of valves with the consequent result that the motor vehicle embodying the present invention can keep the vehicle level substantially constant even after the vehicle has been stopped for a considerably long period of time. This enables the motor vehicle to be ready to start as soon as the engine is started. Moreover, the suspension unit embodying the present invention can maintain the vehicle level substantially constant independently of the variation in load acting on the vehicle body, and the vehicle level can be selected depending upon the condition of road surface.

What is claimed is:

1. A suspension unit for a vehicle, having a body structure and wheel supporting means, comprising a cylinder having formed therein a cylinder chamber filled with pressurized fluid, an inlet passageway opening into said cylinder chamber and communicating with a source of pressurized fluid and an outlet passageway opening into said cylinder chamber and communicating with a drain line, a piston axially slidable in said cylinder chamber, a piston rod connected to said piston and extending externally of said cylinder, a free piston axially slidably fitted in said cylinder chamber, between said piston and said inlet and outlet passageways opening into said cylinder chamber, and having formed therein a passageway providing fluid communication therethrough, a first control valve having a valve head for controlling fluid communication between said cylinder chamber and said inlet passageway, said valve head being operable responsive to the axial movement, in one direction, of said free piston to provide said fluid communication between said cylinder chamber and said inlet passageway, a second control valve having a valve head for controlling fluid communication between said cylinder chamber and said outlet passageway, said valve head of said second control valve being operable responsive to the axial movement, in another direction, of said free piston to provide said fluid communication between said cylinder chamber and said outlet passageway, a first detecting member disposed between said free piston and said valve head of said first control valve and operable to detect axial movement of said free piston in excess of a predetermined limit to move said valve head to a position to provide communication between said inlet passageway and said cylinder chamber, a second detecting member disposed between said free piston and said valve head of said second control valve, and operable to detect axial movement of said free piston in excess of a predetermined limit to move said valve head to a position to provide communication between said outlet passageway and said cylinder chamber, a first preloaded spring disposed between an end wall of said cylinder chamber and said free piston to bias said free piston toward said piston, and a second preloaded spring disposed between said free piston and said piston to bias said free piston toward the end wall of said cylinder chamber, said first and second preloaded springs cooperating with each other to hold said free piston in a position in which said first and second detecting members are prevented from moving said valve heads of said first and second control valves, respectively.

2. A suspension unit as claimed in claim 1, further comprising vehicle level adjusting means for adjusting the total length of the suspension unit.

3. A suspension unit as claimed in claim 2, in which said piston rod has an axial bore open at one end to said cylinder chamber and at the other end communicating with said source of pressurized fluid and in which said vehicle level adjusting means comprise a floating piston axially slidable in said bore in the piston rod for defining a control fluid chamber between said floating piston and said other end of said bore, said floating piston receiving at its upper surface said second preloaded spring, and a control fluid regulator valve unit for selectively providing fluid communication between said control fluid chamber and said source of pressurized fluid.

4. A suspension unit as claimed in claim 1, in which said cylinder further includes a cylinder head having formed therein said inlet and outlet passageways, and in which said cylinder head further includes in said inlet passageway a first chamber communicating with said source of pressurized fluid and a second chamber communicating at one end with said first chamber and at the other end with said cylinder chamber, and a third chamber communicating at one end with a drain line through a first auxiliary passageway having a restriction therein and at the other end with said cylinder chamber and said cylinder head also includes in the outlet passageway a fourth chamber communicating with said drain line and a fifth chamber communicating at one end with said fourth chamber and at the other end with said cylinder chamber and said cylinder head still further includes a second auziliary passage communicating with said cylinder chamber and with said drain line through a passageway with a restrictor provided therein, and further comprising an inlet valve having a valve head situated in said first chamber and a piston having a body portion axially slidable in said first and second chambers and a flange portion provided at one end of said body portion, said valve head mounted on said piston, said body portion of the piston being hermetically and slidably received in the inlet passageway between said first and second chambers thereby to shut off fluid communication therebetween through the inlet passageway, said flange portion of the piston dividing said second chamber into an upper and a lower portions and being hermetically and slidably received in said second chamber thereby to shut off fluid communication between the upper portion and lower portion of said second chamber, said upper portion of the second chamber communicating with said third chamber, said lower portion of the second chamber communicating with said cylinder chamber, said piston having a passage therein providing communication between said first chamber and the lower portion of second chamber, and a spring seated on said flange portion for urging at all times said inlet valve in the direction of opening said inlet passageway, and in which said first control valve is situated in said third chamber and further including a spring normally urging said first valve to a position to block fluid communication between said third chamber and said cylinder chamber, said first detecting member having a predetermined length and projecting from said valve head into said cylinder chamber to detect the axial movement of said free piston exceeding a predetermined limit thereby to open said first valve, the spring of said inlet valve and the sectional area of said flange portion of the piston of said inlet valve being selected so that when said first control valve is closed to shut off fluid communication between said cylinder chamber and said upper portion of the second chamber the total force caused by the fluid pressure acting on the bottom surface of said flange portion exceeds the total force of said spring of the inlet valve acting on the upper surface of said flange portion thereby to close said inlet valve and when said first control valve is opened to provide fluid communication between said cylinder chamber and said upper portion of said second chamber thereby to apply fluid pressure on the upper surface of said flange portion of said piston of said inlet valve the sum of the total force caused by the fluid pressure and the total force of the spring of the inlet valve acting on the upper surface of said flange portion exceeds the force caused by the fluid pressure acting on the bottom surface of said flange portion thereby to open said inlet valve, and further comprising an outlet valve having a valve head situated in said fourth chamber and a piston having a body portion axially slidable in said fourth and fifth chambers and a flange portion provided at one end of said body portion, said valve head being seated on said piston, said body portion of the piston being hermetically and slidably received in the outlet passageway between said fourth and fifth chambers thereby to shut off fluid communication therebetween through said outlet passageway, said flange portion of the piston of the outlet valve dividing said fifth chamber into an upper and a lower portions and hermetically and slidably received in said fifth chamber thereby to shut off fluid communication between the upper portion and the lower portion of said fifth chamber directly, said upper portion of the fifth chamber communicating with said second auxiliary passageway between said restrictor of the second auxiliary passageway and said cylinder chamber, said lower portion of the fifth chamber communicating with said cylinder chamber through a passage, said piston of the outlet valve having a passage therein providing communication between said fourth chamber and the lower portion of said fifth chamber, and a spring seated on said flange portion of the piston of said outlet valve for urging at all times said outlet valve in a direction of opening said outlet passageway, and in which said second control valve normally closes said second auxiliary passageway, the spring of said outlet valve and the sectional area of said flange portion of the piston of said outlet valve being selected so that when said second control valve is closed to shut off fluid communication between said cylinder chamber and said upper portion of the fifth chamber the total force caused by the fluid pressure acting on the bottom surface of said flange portion of the piston of said outlet valve exceeds the total force of said spring of the outlet valve acting on the upper surface of said flange portion of the piston of said outlet valve thereby to close said outlet valve and when said second control valve is opened to provide fluid communication between said cylinder chamber and said upper portion of said fifth chamber thereby to apply fluid pressure to the upper surface of said flange portion of said piston of said outlet valve the sum of the total force of the spring of the outlet valve acting on the upper surface of the flange portion of said outlet valve exceeds the total force caused by the fluid pressure acting on the bottom surface of said flange portion of the piston thereby to open said outlet valve.

5. A suspension unit as claimed in claim 4, in which said second control valve has and a spring urging said second valve at all times in a direction of closing said second auxiliary passage, and in which said second detecting member projects from said valve head toward said free piston and having a detecting head received in a recess formed in said free piston and slidable relative thereto, said recess being provided with an engaging portion for engaging with said detecting member when the axial movement of said free piston exceeds a predetermined limit.

6. A suspension unit as claimed in claim 4, in which said second auxiliary passageway communicates with said cylinder chamber between said free piston and the piston and includes a sixth chamber for receiving said second control valve, and in which said second valve has a spring for urging said second valve at all time in the direction of closing said second auxiliary passage, said second detecting member projects from said valve head of said second valve into said cylinder chamber between said free piston and the piston, said second detecting member having a predetermined length and detecting the axial movement of said free piston exceeding a predetermined limit to open said second valve thereby to provide communication between said upper portion of said fifth chamber and the cylinder chamber between the free piston and the piston.

7. A suspension unit as claimed in claim 1, in which said piston has formed therethrough a restricted passage for providing fluid communication therethrough thereby to damper the impact of bumps transferred to said suspension unit.

8. A suspension unit as claimed in claim 1, in which said cylinder and said piston rod are connected to said body structure and said wheel supporting means, respectively.

9. A suspension unit as claimed in claim 1, in which said first control valve includes a spring urging said valve head to a position to block said fluid communication between said inlet passageway and said cylinder chamber and said second control valve includes a spring urging said valve head to a position to block said fluid communication between said outlet passageway and said cylinder chamber, and in which said first detecting member projects from said valve head toward said free piston to engage said free piston moved in excess of said predetermined limit to open said first control valve and said second detecting member projects from said valve head toward said free piston and having a detecting head which is received in a recess fromed in said free piston, said recess having a portion engaging said detecting head of said second detecting member when the axial movement of said free piston exceeds a predetermined limit.

10. A suspension unit for a vehicle, having a body structure and wheel supporting means, comprising a cylinder having formed therein a cylinder chamber filled with pressurized fluid, an inlet passageway opening into said cylinder chamber and communicating with a source of pressurized fluid and an outlet passageway opening into said cylinder chamber and communicating with a drain line, a piston axially slidable in said cylinder chamber, a piston rod connected to said piston and extending externally of said cylinder, a free piston axially slidably fitted in said cylinder chamber between said piston rod and said inlet and outlet passageways opening into said cylinder chamber and having formed therein a passageway providing fluid communication therethrough, a first control valve having a valve head for controlling fluid communication between said cylinder chamber and said inlet passageway, said valve head being operable responsive to the axial movement, in one direction, of said free piston to provide said fluid communication between said cylinder chamber and said inlet passageway, a second control valve having a valve head for controlling fluid communication between said cylinder chamber and said outlet passageway, said valve head of said second control valve being operable responsive to the axial movement, in another direction, of said free piston to provide said fluid communication between said cylinder chamber and said outlet passageway, a first preloaded spring disposed between an end wall of said cylinder chamber and said free piston to bias said free piston toward said piston, and a second preloaded spring disposed between said free piston and said piston to bias said free piston toward the end wall of said cylinder chamber, said first and second preloaded spring cooperating with each other to hold said free piston in a balanced position, in which said first control valve further includes a detecting member projecting from said valve head and a spring urging said first control valve to a position to block said fluid communication between said cylinder chamber and said inlet passageway, said detecting member extending toward said free piston to detect the axial movement of said free piston in excess of a predetermined limit to actuate said valve head to a position to provide said fluid communication between said cylinder chamber and said inlet passageway, and said second control valve further includes a valve stem projecting from said valve head, a detecting member provided at one end of said valve stem to detect the axial movement of said free piston to actuate said valve head to a position to provide said fluid communication between said cylinder chamber and said outlet passageway, and a spring urging said second control valve to a position to block said fluid communication between said cylinder chamber and said outlet passageway, said detecting member of said control valve being received in a recess formed in said free piston, said recess having a portion engaging said detecting member of said second control valve when the axial movement of said free piston exceeds a predetermined limit.

\* \* \* \* \*